(12) United States Patent
Friedl et al.

(10) Patent No.: US 9,714,264 B2
(45) Date of Patent: Jul. 25, 2017

(54) METHOD FOR WORKING UP AN AQUEOUS LIGNIN CONTAINING SOLUTION

(71) Applicant: ANNIKKI GMBH, Graz (AT)

(72) Inventors: Anton Friedl, Vienna (AT); Abdel Halim Fuqaha, Tulln (AT); Felix Weinwurm, Vienna (AT); Thomas Ters, Vienna (AT)

(73) Assignee: ANNIKKI GMBH, Graz (AT)

( * ) Notice: Subject to any disclaimer, the term of this patent is extended or adjusted under 35 U.S.C. 154(b) by 0 days.

(21) Appl. No.: 14/358,590

(22) PCT Filed: Nov. 6, 2012

(86) PCT No.: PCT/EP2012/071884
§ 371 (c)(1),
(2) Date: May 15, 2014

(87) PCT Pub. No.: WO2013/079280
PCT Pub. Date: Jun. 6, 2013

(65) Prior Publication Data
US 2014/0329999 A1    Nov. 6, 2014

(30) Foreign Application Priority Data
Nov. 28, 2011 (EP) .................. 11190966

(51) Int. Cl.
*C07G 1/00* (2011.01)
*B01D 61/02* (2006.01)
*B01D 61/58* (2006.01)
*C08H 7/00* (2011.01)
*C08H 8/00* (2010.01)
*C08L 97/00* (2006.01)
*B01D 61/14* (2006.01)

(52) U.S. Cl.
CPC ............ *C07G 1/00* (2013.01); *B01D 61/027* (2013.01); *B01D 61/58* (2013.01); *C08H 6/00* (2013.01); *C08H 8/00* (2013.01); *C08L 97/005* (2013.01); *B01D 61/145* (2013.01); *B01D 2317/022* (2013.01); *Y02P 20/582* (2015.11)

(58) Field of Classification Search
CPC ......... C07G 1/00; B01D 61/58; B01D 61/027
See application file for complete search history.

(56) References Cited

U.S. PATENT DOCUMENTS

| | | | |
|---|---|---|---|
| 4,395,543 A | 7/1983 | Wang et al. | |
| 6,454,946 B1* | 9/2002 | DeFrees .................. | 210/653 |
| 2003/0055227 A1* | 3/2003 | Shukla et al. ............ | 530/507 |
| 2005/0203291 A1 | 9/2005 | Svenson et al. | |
| 2006/0016751 A1* | 1/2006 | Ali ........................... | B01D 61/022 |
| | | | 210/644 |
| 2009/0014386 A1 | 1/2009 | Manttari et al. | |
| 2009/0069550 A1* | 3/2009 | Belanger et al. .............. | 530/507 |
| 2011/0250637 A1* | 10/2011 | Kurihara et al. .............. | 435/41 |
| 2013/0217868 A1* | 8/2013 | Fackler et al. ................ | 530/507 |
| 2013/0217869 A1* | 8/2013 | Ters et al. ..................... | 530/507 |
| 2014/0017729 A1* | 1/2014 | Minamino et al. ............ | 435/85 |
| 2014/0308712 A1* | 10/2014 | Hanakawa et al. ............ | 435/99 |
| 2015/0183813 A1* | 7/2015 | Eskelinen et al. | |

FOREIGN PATENT DOCUMENTS

| | | |
|---|---|---|
| CN | 101 899 488 A | 12/2010 |
| CN | 102 174 593 A | 9/2011 |
| WO | WO 93/15261 A1 | 8/1993 |
| WO | WO 02/053781 | 7/2002 |
| WO | WO 02/053783 | 7/2002 |
| WO | WO 2007/048879 | 5/2007 |
| WO | WO 2012/027767 A1 | 3/2012 |

OTHER PUBLICATIONS

Koch Membrane Systems (Spirapro™ 8" Pharmaceutical Grade NF Elements, 2012.*
U.S. Appl. No. 14/360,537, filed May 23, 2014, Ters et al.
P. Tomani, 2009, The LignoBoost Process, NWBC-2009 The 2nd Nordic Wood Biorefinery Conference, Helsinki, Finland, Sep. 2-4, 2009, 181-188.
Avgerinos & Wang (1983), Biotechnology and Bioengineering, vol. XXV, 67-83.
Quesada-Medina, J, et al., "Organosolv extraction of lignin from hydrolyzed almond shells and application of the delta-value theory", Bioresource Technology, Elsevier BV, GB, Bd. 101, No. 21, Nov. 1, 2010, p. 8252-8260, XP027134535.
Xuejun Pan, et al., "Organosolv Ethanol Lignin from Hybrid Poplar as a Radical Scavenger: Relationship between Lignin Structure, Extraction Conditions, and Antioxidant Activity", Journal of Agricultural and Food Chemistry, American Chemical Society, US, Bd. 54, No. 16, Aug. 9, 2006, p. 5806-5813, XP008148495.
Max Phillips: "The Chemistry of Lignin", Jul. 6, 1928, p. 1986-1989.
International Preliminary Report on Patentability & Written Opinion for PCT Patent Application No. (PCT/EP2012/073574), Mailed Date: Jun. 12, 2014, Filed Date: Nov. 26, 2012, 8 pages.
A. Toledano et al., Chemical Engineering Journal 157 (2010) 93-99.
R. Schlesinger et al. (Desalination 192 (2006) 303-314).
A.-S. Jönsson et al. (2008: Chemical Engineering Research and Design, 86, 1271-1280).
Persson T et al: "Fractionation of process water in thermomechanical pulp mills", Bioresource Technology, Elsevier BV, Bd. 101, No. 11, Jun. 1, 2010, p. 3884-3892, XP026917419.

* cited by examiner

*Primary Examiner* — Liam J Heincer
(74) *Attorney, Agent, or Firm* — Workman Nydegger

(57) ABSTRACT

A method for working up an aqueous, alkaline-alcoholic and lignin containing solution via nanofiltration, wherein a permeate and a retentate are obtained, which permeate is an aqueous, lignin-starved solution and which retentate is an aqueous lignin-enriched solution.

17 Claims, 4 Drawing Sheets

METHOD FOR WORKING UP AN AQUEOUS LIGNIN CONTAINING SOLUTION

BACKGROUND

The invention relates to a method for working up an aqueous, alkaline-alcoholic and lignin containing solution. The invention relates in particular to a method for the preparation of lignin from aqueous solutions, which are obtained in the cleavage of lignocellulose.

In connection with the shortage of crude oil, the renewable resource lignocellulose (straw, wood, paper waste, etc.) has been gaining more and more importance as a starting material for chemical products and fuels. Lignocellulose consists of the ultra-structurally cross-linked polymeric main components cellulose, hemicellulose and lignin, frequently accounting for about 85-90% of the raw material. The remaining amount may be summarized under the term low-molecular ingredients. Among these ingredients, there is to be stressed, apart from extract materials and inorganic by-products, especially the acetate. Acetyl groups are present especially in deciduous trees and grasses as well as other lignocelluloses. In the majority of cases, these are chemically bound to hemicellulose, more precisely, in the polymer O-acetyl-4-O-methyl glucurono(arabino)xylane. The acetate is of significant importance in numerous ways. As a recyclable material, it may be prepared in the form of acetic acid by way of distillation from cellulose pulping liquor of deciduous tree celluloses. In the preparation of bio-alcohol from lignocellulosic substrates such as, e.g. straw, acetate is a strong inhibitor, negatively affecting the yield of alcohol.

The cleavage of the components present as polymers and the separation thereof into individual product flows as well as the further processing thereof into high-order products is the task of biorefineries of the biochemical platform. The rentability of such biorefineries is largely dependent on the value creation on the basis of the product flows.

Apart from the use of the carbohydrate portion, also the amount and the quality of the obtained lignin exert a strong influence on the value creation of the entire process. Lignin is steadily gaining economic importance as a substitute for petrochemically produced aromatics. The possibilities of use of the prepared lignin, however, are significantly dependent on its chemical composition, and especially on the molecular weight of the prepared lignin fraction. In particular sulfur-free low-molecular lignin fractions are very in demand as a raw material for utilization in the production of plastics and resin. In contrast to Kraft or sulphite cellulose plants, biorefineries aim at the preparation of sulfur-free lignin.

Among the methods used in biorefineries for working up lignocellulose, there are to be mentioned especially alkaline methods, the work-up principle of which being primarily the removal of the lignin. Especially deciduous wood, straw, bagasse or annual and perennial grasses have proven to be rather advantageous as lignocellulose substrates. The chemical principle this is based upon is the alkaline deesterification, by means of which the bonds between lignin and hemicellulose as well as also acetic acid-hemicullose esters are cleaved. The additional use of an alcohol, with ethanol being preferably used, improves the solubility of lignin, which enables lower reaction temperatures. Such a method was described by Avgerinos and Wang, and in 1981 the patent was filed (U.S. Pat. No. 4,395,543). Therein, there is claimed a method for degrading lignocellulose, wherein there is used an extraction solution consisting of water, having 40 to 75% alcohol and a pH of 11 to 14. Additionally, in the patent it is indicated that the quantity of the released hemicellulose cleavage products decreases with increasing content of alcohol. Thus, degradation solutions having a high alcohol content achieve more selective results.

Extraction solutions from lignocellulose degradation with alcohol, water and base thus frequently show high pH values in the range from 12 to 14, comprise alcohol concentrations in the range from 40 to 75% and temperatures from 40 to 90° C.

An essential economic factor of the alkaline-alcoholic degradation method is the way how the alcohol is being recovered. Primarily, this is realized by way of thermal recovery from the degradation solution. An essential saving potential is the reduction of the quantity of the solution to be thermally treated, via separating off the alcoholic degradation solution as selective as possible.

While via ultrafiltration of lignin solutions, e.g., by using ceramic membranes, lignin fractions are separated with a cut-off of 5, 10 or 5 kD, respectively, (A. Toledano et al. Chemical Engineering Journal 147 (2010) 93-99), nanofiltration further offers the possibility to separate fractions having a low molecular weight. With regard to hemicellulose components in alkaline process waste waters in cellulose industry, R. Schlesinger et al. (Desalination 192 (2006) 303-314) reports a nearly complete separation of molecules having more than 1 kD.

In nanofiltration, there are used different membrane materials having different membrane structures. Inorganic ceramic membranes are composed of homogenous material and show a change in pore structure via the membrane thickness. Rather frequently composite membranes are used, wherein the active membrane separation layer is decisive for the separation effect. As membrane materials for this separation layer, there are frequently used polyether sulfone membranes, polypiperazine membranes as well as aromatic polyamide membranes.

In the field of paper and cellulose, nanofiltration was, for example, used in WO 02/053783 and WO 02/053781 in order to enrich xylose in the permeate of the nanofiltration from the "black liquor" of a sulphite process. In WO/2007/048879 there is described a nanofiltration process for separating xylose from a biomass hydrolysate having a high dry matter content.

Further there is reported the preparation of monosaccharides from alkaline black liquor by way of nanofiltration (US 2009/0014386 A1).

In US 20060016751 there is described a nanofiltration method for concentrating extract and waste material streams of a paper factory.

In the last couple of years, the interest in the preparation of lignosulfonates from the pulp of Kraft cellulose processes has increased considerably. A.-S. Jönsson et al. (2008: Chemical Engineering Research and Design, 86, 1271-1280) used a combined process of ultrafiltration/nanofiltration and concentrated the lignin content of the aqueous alkaline solution from 60 g/L to 165 g/L. They used a series of membranes, consisting of polyether sulfone, polysulfone and polyvinyl fluoride, at 60° C.

Nanofiltration with polyether sulfone and polysulfone membranes was further used for recovering sodium hydroxide from strongly alkaline solutions (about 200 g/l NaOH) in a cellulose fibre production. The tests were carried out in the temperature range from 20 to 50° C. in a laboratory agitator cell. The obtained retentates for hemicellulose were in the range from 50 to 95% (Schlesinger 2006). In the course of this, a polyether sulfone membrane was tested, which proved itself well under aqueous-alkaline conditions. That membrane was also tested under strongly alkaline-alcoholic conditions of the method according to the invention, and showed to be unstable in the temperature range above 40° C.

For aqueous-organic solutions having a high solvent part, modified polyimide membranes were used. These membranes, however, showed to be pH-unstable in the alkaline range.

SUMMARY

The task of the invention is the provision of a simple method for working up an aqueous, alkaline-alcoholic and lignin containing solution, which overcomes the disadvantages of prior art methods.

DETAILED DESCRIPTION

Figure 1:
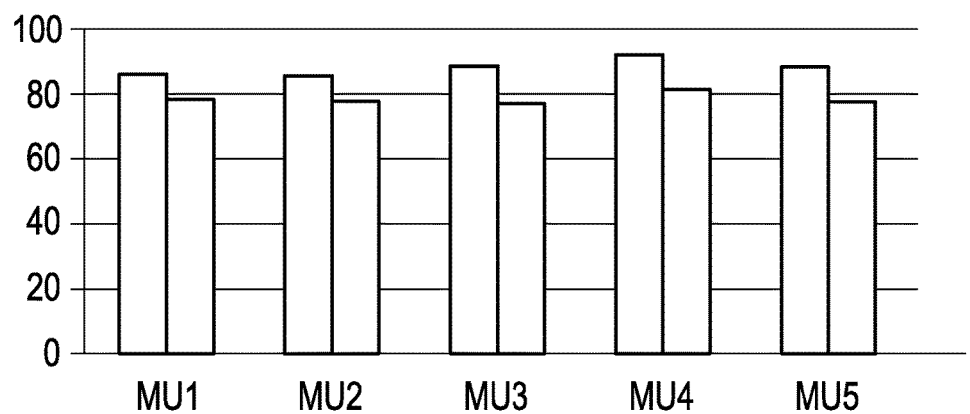
FIG. 1 is a graph showing the lignin retention power of various ultrafiltration membranes.

The method according to the invention is a method for working up an aqueous, alkaline-alcoholic and lignin containing solution via nanofiltration, wherein a permeate and a retentate are obtained, which permeate is an aqueous, lignin-starved solution and which retentate is an aqueous lignin-enriched solution.

It has surprisingly been turned out that lignin may be separated from an aqueous, alkaline-alcoholic and lignin containing solution, or from the substances extracted via alkaline-alcoholic degradation of lignocellulose, respectively, via nanofiltration with a mean retention capacity for lignin of nearly 100% (see also example 1 below).

The pH of the solution to be worked up is preferably 8-14, in particular 10-14, and especially preferably 11-13.

The content of ethanol in the solution to be worked up is preferably 20 to 90%, preferably 40 to 70%, and especially preferably 60%.

The method according to the invention is carried out preferably at temperatures from 20-70° C., preferably 30-60° C., and especially preferably 40-50° C.

The solution to be worked up may origin from lignocellulose degradation, wherein, in order to increase the concentration of the substances extracted from the lignocellulose, the solution to be worked up had previously been concentrated into untreated starting substrate by one or several recycling steps.

A further embodiment of the method according to the invention is that the solution to be worked up was concentrated by ultrafiltration in order to increase the concentration of the substances extracted from the lignocellulose.

For degradation solutions, which had been concentrated by recycling or ultrafiltration, respectively, there were also obtained lignin retention values of more than 95% (see example 2 below). The high retention capacity of the membranes makes it possible, to recover a very pure alkaline-alcoholic degradation solution, which may be re-used for degradation without any additional thermal cleaning efforts. In this way, lignin and other extract materials are enriched in the retentate.

There was surprisingly further found that by using membranes having a polyamide separation layer, not only lignin but rather also other extracted components can be enriched with retention rates of more than 95% in the retentate (example 3a-f):
Total solids: 95%-100%
Lignin: 95%-100%
Ferulic acid: 95%-100%
Cumaric acid: 95%-100%
Acetate: 80%-100%
Ash: 80%-100%

Methodology of Ultra- and Nanofiltration:

The degradation solution is maintained in a stirred and tempered vessel at the desired temperature. It is moved by the pump (pressure from 6 to 60 bar) via a flexible pressure tube to the membrane module. The flat membrane module, in principle, is composed of three steel plates, wherein the central one has a flow channel on the top surface thereof, across which there is placed a test strip of the membrane (about 7×21 cm) and fixed at the upper steel plate. The lowest and the top plate are pulled together by means of screws, in this way guaranteeing the tightness of the module. In operation, the medium flows underneath the membrane, with a part exiting as permeate through the membrane toward the top. The permeate is collected in a sinter plate that is inserted in the upper steel plate, and is then moved further toward the outside. The exiting permeate is subsequently transported back into the vessel. The retentate is also transported back into the vessel, so that the feed always has a constant composition. In this way, it is possible to evaluate and assess the stability of the membrane, without fluctuation of the separation performance caused by concentration.

Analytics

Total solids designates the retentate that remains, if the liquid phase of the sample is evaporated at 105° C. to weight constancy. The ash content is the result of the incineration of the total solids at 650° C. The lignin content in the solution was photometrically determined at 280 nm ($\epsilon$=19.4 L $g^{-1}$ $cm^{-1}$). The concentrations of cumaric and ferulic acid were determined by HPLC and DAD (Diode Array Detector). For the determination of the acetate, there was used a commercial enzymatic assay (Boehringer Mannheim R-Biopharm).

Nanofiltration membranes tested:
Polyamide on polysulfone
Polyamide thin film composite on polyester
Polyamide on polypropylene
Polyimide
"Proprietary thin film"
Polysulfone
Polyether sulfone (PES) on polyethylene (PE)

By way of the following examples, preferred variants of the method according to the invention are described in greater detail. The temperature is indicated in degree Celsius (° C.)

Example 1

Nanofiltration for Preparing a Purified Alkaline-Alcoholic Solution in the Permeate as Well as a Concentrated Solution of Substances Extracted from the Lignocellulose in the Retentate, from a Degradation Solution, Originating from the Degradation of Lignocellulose with an Alkaline-Alcoholic Solution Preparation of the Degradation Solution:

10 g of wheat straw reduced to pieces were suspended in a 500 mL reaction vessel in 200 mL (5% solid portion) of a solution pre-heated to 70° C., consisting of water/ethanol in 60%, EtOH and 0.8 g NaOH. The suspension was magnetically stirred at 200 rpm and 70° C. continuously for 18 h. Subsequently, the solid portion was separated by filtration. The lignin content of the solution was photometrically determined at 280 nm ($\epsilon$=19.4 L $g^{-1}$ $cm^{-1}$).

Solution from Lignocellulose Degradation:
Lignin content, not concentrated: about 1.5%/L
pH: 12.5
Ethanol content: 60%
Temperature: 20° C., 40° C., 60° C.

The membranes M1 and M2 each have a separation layer made from polyamide, whereas M3 has a separation layer made from polyether sulfone.

In Table 1 there is described the mean retention of lignin in % at certain pressures and temperatures for the membranes M1, M2 and M3 in the preparation of a purified alkaline-alcoholic solution in the permeate, as well as a concentrated solution of substances extracted from the lignocellulose in the retentate, originating from a degradation solution of lignocellulose with an alkaline-alcoholic solution, by nanofiltration

TABLE 1

| Membrane | Temperature in ° C. | Pressure in bar | Mean retention of lignin in % | Trend | Annotation |
|---|---|---|---|---|---|
| M1 | 20 | 6 | 98.92 | stable | |
| | | 12 | 99.55 | stable | |
| | | 36 | 99.69 | stable | |
| | 40 | 6 | 99.06 | stable | |
| | | 12 | 99.67 | stable | |
| | | 32 | 99.66 | stable | |
| | 60 | 12 | 99.34 | stable | |
| M2 | 20 | 6 | 97.02 | stable | |
| | | 12 | 98.14 | stable | |
| | | 36 | 98.76 | stable | |
| | 40 | 6 | 94.05 | stable | |
| | | 12 | 93.95 | stable | |
| | | 36 | 97.88 | fluctuating | |
| | 60 | 12 | 90.99 | stable | |
| M3 | 20 | 6 | 85.36 | stable | |
| | | 12 | 88.02 | stable | |
| | | 36 | 96.83 | fluctuating | |
| | 40 | 6 | 86.99 | decreasing | |
| | | 12 | 90.23 | decreasing | |

Example 2

Preparation of a Purified Alkaline-Alcoholic Solution in the Permeate, as Well as a Concentrated Solution of Substances Extracted from Lignocellulose in the Retentate, from a Degradation Solution Originating from the Degradation of Lignocellulose with an Alkaline-Alcoholic Solution, by Nanofiltration, Wherein the Degradation Solution 2a) has Previously been Concentrated by Recycling, or
2b) has Previously been Concentrated by Ultrafiltration
Preparation of the Degradation Solution:
10 g of wheat straw reduced to pieces were suspended in a 500 mL reaction vessel in 200 mL (5% solid portion) of a solution pre-heated to 70° C., consisting of water/ethanol in 60%, EtOH and 0.8 g NaOH. The suspension was magnetically stirred at 200 rpm and 70° C. continuously for 18 h. Subsequently, the solid portion was separated by filtration. The lignin content of the solution was photometrically determined at 280 nm ($\epsilon$=19.4 L g$^{-1}$ cm$^{-1}$).
Solution from Lignocellulose Degradation:
Lignin content not concentrated: about 1.5%/L
pH: 12.5
Ethanol content: 60%
Concentration 2a):
The degradation solution was previously concentrated into untreated starting substrate by one recycling in order to increase the concentration of the substances extracted from the lignocellulose.
Thereby, the filtrate of the lignocellulose degradation was adjusted to the starting pH using NaOH, and fresh straw (5% w/v) was added. The suspension was again treated under the conditions described above. The concentrated degradation solution then was subjected to nanofiltration.
Lignin content, concentrated by 1×recycling: about 3%
Concentration 2b):
The degradation solution was previously concentrated by way of ultrafiltration in order to increase the concentration of the substances extracted from the lignocellulose.
Two alkaline-alcoholic degradation solutions (batch 1 and batch 2) were subjected to ultrafiltration using 5 different membranes.
The results of the lignin retention power are outlined in FIG. 1. In FIG. 1 the two bars over the numbers 1 to 5 on the x-axis correspond to the two batches (at left at each time batch 1, at right thereof at each time batch 2). The indications "MU1" to "MU5" designate the ultrafiltration membranes used, which are composed from the following material:
MU1=Polysulfone
MU2=Polysulfone/PES on polypropylene
MU3=Polysulfone/PES on polyester
MU4=Polyether sulfone (PES)
MU52=PES H on PE/PP In the y-axis the lignin retention potential is indicated in %.

As can be seen from FIG. 1 the results show a relatively constant separation performance of about 80%.

The lignin content of the degradation solution which is concentrated by ultrafiltration is ca. 2%.

In Table 2 the medium lignin retention in % at determined pressure and temperature for the membrane M1 under the conditions of concentrating according to 2a) and 2b) is described.

TABLE 2

| Membrane | Temperature in ° C. | Pressure in bar | Mean retention of lignin in % | Trend | Annotation |
|---|---|---|---|---|---|
| 2a) MU1 | 60° C. | 32 | 99.75 | stable | Concentrated feed solution |
| 2b) MU1 | 60° C. | 32 | 96.81 | stable | Concentrated feed solution |

Example 3

Nanofiltration of an Alkaline-Ethanolic Degradation Solution from Lignocellulose Via a Nanofiltration Membrane Having a Polyamide Separation Layer: Separation Performance of Different Components Preparation of the Degradation Solution:
10 g wheat straw reduced to pieces were suspended in a 500 mL reaction vessel in 200 mL (5% solid portion) of a solution pre-heated to 70° C., consisting of water/ethanol in 60%, EtOH and 0.8 g NaOH. The suspension was magnetically stirred at 200 rpm and 70° C. continuously for 18 hours. Subsequently, the solid portion was separated by filtration. The lignin content of the solution was photometrically determined at 280 nm ($\epsilon=19.4$ L g$^{-1}$ cm$^{-1}$).

Solution from Lignocellulose Degradation:
Lignin content not concentrated: about 1.5%/pH:
pH: 12.5
Ethanol content: 60%

The solution from the lignocellulose digestion was subjected to nanofiltration via a membrane (MN1) having a polyamide layer at a pressure of 12 bar and at a temperature of 60° C.

The results are shown in FIGS. 2 to 7.

Figure 2:
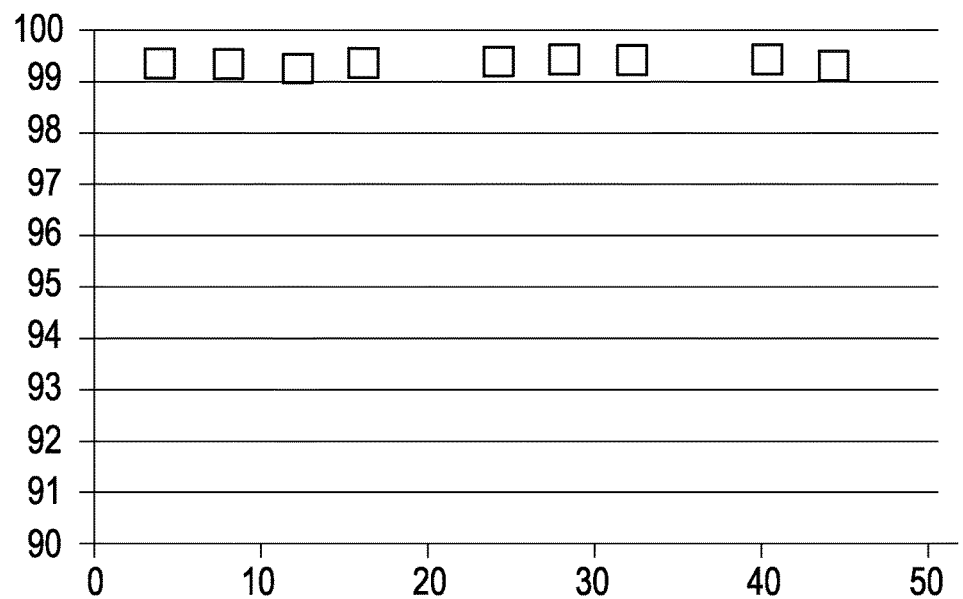
FIG. 2 is a graph showing lignin retention.
Figure 3:
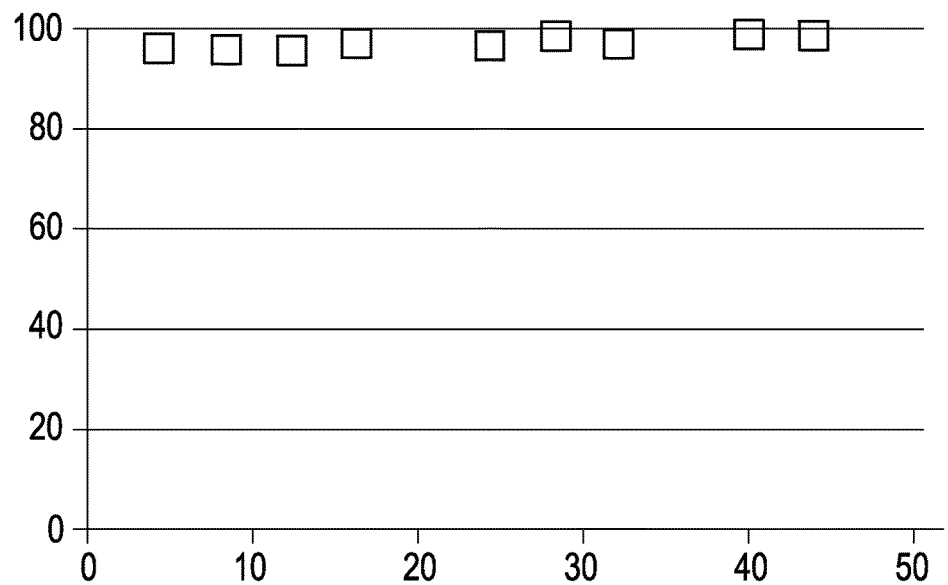
FIG. 3 is a graph showing total solids retention.
Figure 4:
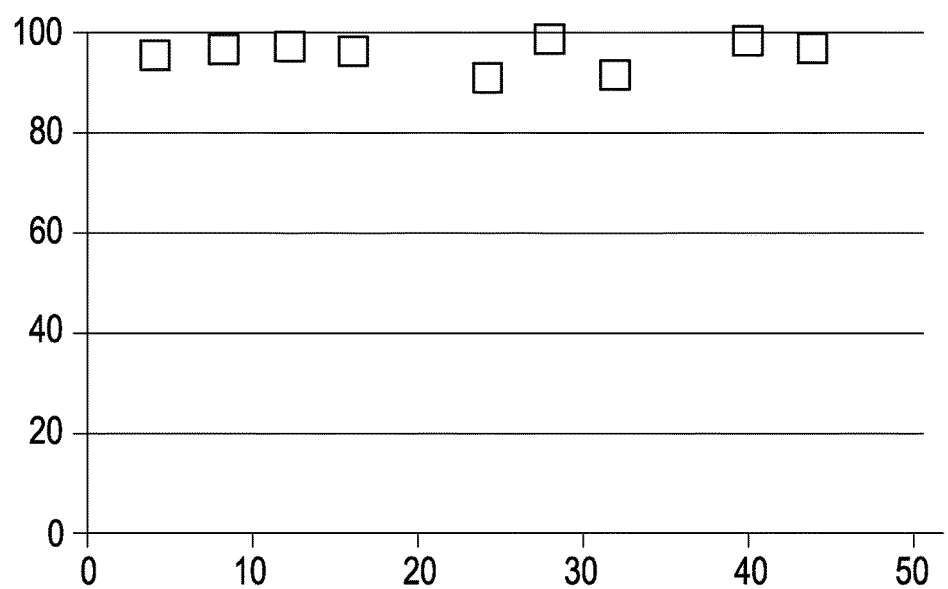
FIG. 4 is a graph showing ash retention.
Figure 5:
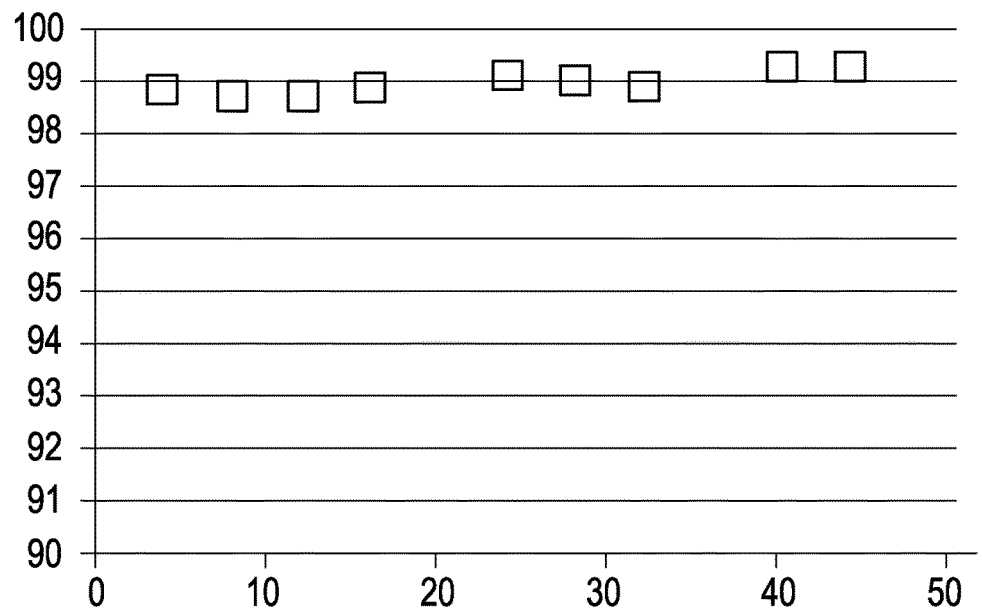
FIG. 5 is a graph showing acetate retention.
Figure 6:
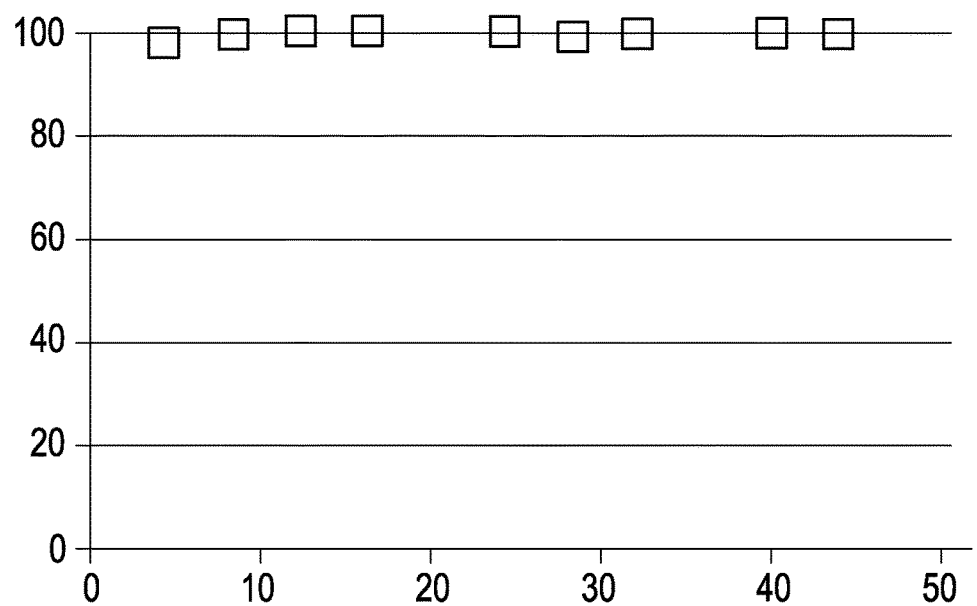
FIG. 6 is a graph showing cumaric acid retention.
Figure 7:
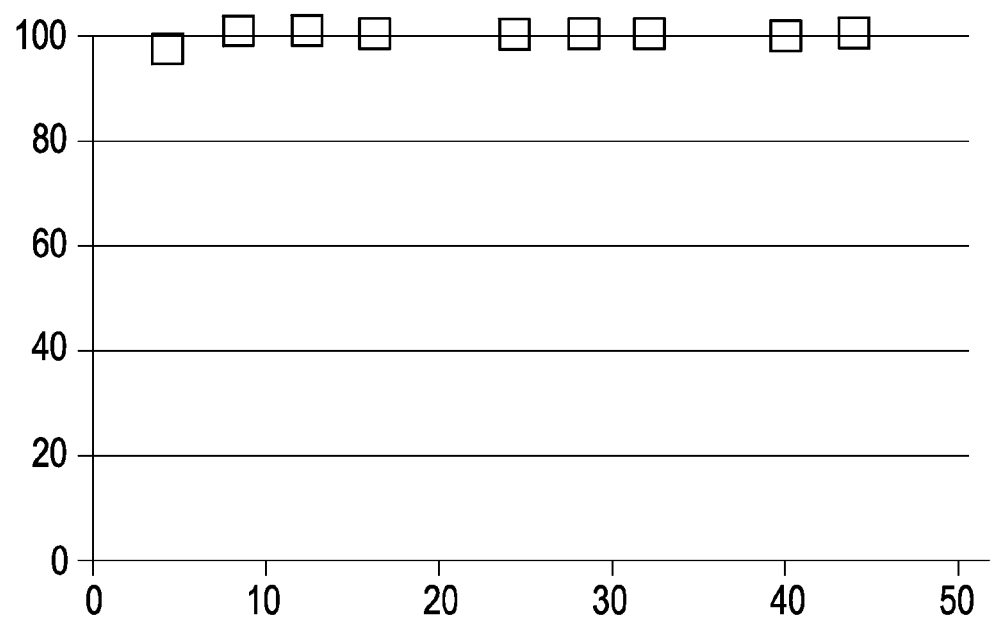
FIG. 7 is a graph showing ferula acid retention.

In FIG. 2 to FIG. 7 on the y-axis in each case the retention in % of the respective substance and on the x-axis the duration of the filtration in hours are indicated In FIG. 2 the lignin retention is shown.
In FIG. 3 the total solids retention is shown.
In FIG. 4 the ash retention is shown.
In FIG. 5 the acetate retention is shown.
In FIG. 6 the cumaric acid retention is shown.
In FIG. 7 the ferula acid retention is shown.

The invention claimed is:

1. A method for working up an aqueous, alkaline-alcoholic and lignin containing solution via nanofiltration, wherein the ethanol content of the solution to be worked up is 20 to 90%, the method comprising:
    performing nanofiltration of the alkaline-alcoholic and lignin containing solution using a filtration membrane made from polyamide or a separation layer made from polyamide; and
    obtaining a permeate and a retentate,
    wherein the permeate is an aqueous, lignin-starved solution, and
    wherein the retentate is an aqueous lignin-enriched solution.

2. A method according to claim 1, wherein the pH value of the solution to be worked up is 8-14.

3. A method according to claim 1, wherein the temperature of the solution to be worked up is 20-70° C.

4. A method according to claim 1, wherein, the solution to be worked up was obtained in the degradation of lignocellulose, which solution has previously been concentrated by one or several recycling steps of the solution to be worked up onto untreated starting substrate, in order to increase the concentration of the substances extracted from the lignocellulose.

5. A method according to claim 1, wherein the solution to be worked up was concentrated by ultrafiltration, in order to increase the concentration of the substances extracted from the lignocellulose.

6. A method according to claim 1, wherein the nanofiltration is performed using a nanofiltration membrane made from polyamide or has a separation layer made from polyamide and wherein the following substances in the retentate are concentrated to the following % of the quantities present in the alkaline-alcoholic and lignin containing solution:
    total solids: 95%-100%
    lignin: 95%-100%
    ferulic acid: 95%-100%
    cumaric acid: 95%-100%
    acetate: 80%-100%
    ash: 80%-100%.

7. A method according to claim 1, wherein the pH value of the solution to be worked up is 10-14.

8. A method according to claim 1, wherein the pH value of the solution to be worked up is 11-13.

9. A method according to claim 1, wherein the ethanol content of the solution to be worked up is 40 to 70%.

10. A method according to claim 1, wherein the ethanol content of the solution to be worked up is 60%.

11. A method according to claim 1, wherein the temperature of the solution to be worked up is 30-60° C.

12. A method according to claim 1, wherein the temperature of the solution to be worked up is 40-50° C.

13. A method according to claim 1, wherein the alkaline-alcoholic and lignin containing solution has a temperature of 20-70° C.

14. A method for working up an aqueous, alkaline-alcoholic and lignin containing solution via nanofiltration, comprising:
    performing nanofiltration of the alkaline-alcoholic and lignin containing solution using a filtration membrane made from polyamide or a separation layer made from polyamide, the alkaline-alcoholic and lignin containing solution having a pH of 10-14 and an alcohol content of 20-90%; and
    obtaining a permeate and a retentate,
    wherein the permeate is an aqueous, lignin-starved solution, and
    wherein the retentate is an aqueous lignin-enriched solution in which at least 95% of the lignin contained in the alkaline-alcoholic and lignin containing solution is retained in the retentate.

15. A method according to claim 14, wherein the alkaline-alcoholic and lignin containing solution has an alcohol content of 40-70%.

16. A method according to claim 14,
    the alkaline-alcoholic and lignin containing solution having a pH of 11-14 and an alcohol content of 40-90%.

17. A method for working up an aqueous, alkaline-alcoholic and lignin containing solution via nanofiltration, comprising:
    performing nanofiltration of the alkaline-alcoholic and lignin containing solution using a nanofiltration filtration membrane made from polyamide or that has a separation layer made from polyamide; and
    obtaining a permeate and a retentate,
    wherein the permeate is an aqueous, lignin-starved solution,
    wherein the retentate is an aqueous lignin-enriched solution, and
    wherein the following substances in the retentate are concentrated to the following % of the quantities present in the alkaline-alcoholic and lignin containing solution:
    total solids: 95%-100%
    lignin: 95%-100%
    ferulic acid: 95%-100%
    cumaric acid: 95%-100%
    acetate: 80%-100%
    ash: 80%-100%.

* * * * *